United States Patent
Park

(10) Patent No.: US 7,181,169 B2
(45) Date of Patent: Feb. 20, 2007

(54) CONTROLLING APPARATUS AND METHOD OF MOBILE COMMUNICATION TERMINAL USING ELECTROSTATIC DETECTION

(75) Inventor: Nam-Joo Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 433 days.

(21) Appl. No.: 10/773,326

(22) Filed: Feb. 9, 2004

(65) Prior Publication Data

US 2004/0185817 A1    Sep. 23, 2004

(30) Foreign Application Priority Data

Feb. 15, 2003 (KR) ............ 10-2003-0009635
Feb. 15, 2003 (KR) ............ 10-2003-0009641

(51) Int. Cl.
*H04B 1/00* (2006.01)
*H04B 17/00* (2006.01)

(52) U.S. Cl. .............. 455/67.11; 455/67.13; 455/226.4; 455/566; 324/457; 361/119

(58) Field of Classification Search ........ 455/63.1, 455/67.7, 67.11, 566, 117, 217, 67.13, 226.1, 455/226.4, 425; 361/91.1–91.3, 119; 340/662; 324/457–458
See application file for complete search history.

(56) References Cited

U.S. PATENT DOCUMENTS

| | | | | |
|---|---|---|---|---|
| 5,359,319 A | * | 10/1994 | Campbell et al. ........ 340/649 |
| 5,463,379 A | * | 10/1995 | Campbell et al. ........ 340/657 |
| 5,485,633 A | | 1/1996 | Burke et al. ........ 455/51.2 |
| 5,717,558 A | * | 2/1998 | Lynn et al. ........ 361/56 |
| 5,903,220 A | * | 5/1999 | Jon et al. ........ 340/600 |
| 6,028,761 A | * | 2/2000 | Cooter ........ 361/212 |
| 6,408,188 B1 | | 6/2002 | Park ........ 455/466 |
| 6,563,319 B1 | * | 5/2003 | Kraz ........ 324/458 |
| 2004/0023694 A1 | * | 2/2004 | Mori et al. ........ 455/566 |
| 2004/0102175 A1 | * | 5/2004 | Rofougaran ........ 455/323 |
| 2004/0109271 A1 | * | 6/2004 | Takeda ........ 361/56 |
| 2006/0035566 A1 | * | 2/2006 | Young et al. ........ 455/550.1 |
| 2006/0040621 A1 | * | 2/2006 | Rofougaran ........ 455/86 |

FOREIGN PATENT DOCUMENTS

| | | |
|---|---|---|
| JP | 05-219109 | 8/1993 |
| JP | 11-355203 | 12/1999 |
| KR | 1999-0085917 | 12/1999 |
| KR | 1020000046198 | 7/2000 |
| KR | 1020030004761 | 1/2003 |
| KR | 1020030039864 | 5/2003 |

OTHER PUBLICATIONS

Office Action issued by the Korean Intellectual Property Office on Jan 17, 2005.

* cited by examiner

*Primary Examiner*—Simon Nguyen
(74) *Attorney, Agent, or Firm*—Fleshner & Kim, LLP

(57) ABSTRACT

A controlling apparatus of a mobile communication terminal using electrostatic detection includes an electrostatic detector for sensing an instantaneous voltage generated at higher than a reference level and applying it to a controller in order to recognize occurrence of a malfunction due to static electricity. Static electricity generated while a mobile terminal is in use is sensed by the controller to remove a no-sensing phenomenon of the display unit. Thus, a reliability of the mobile terminal can be enhanced and the user's convenience can be increased.

10 Claims, 2 Drawing Sheets

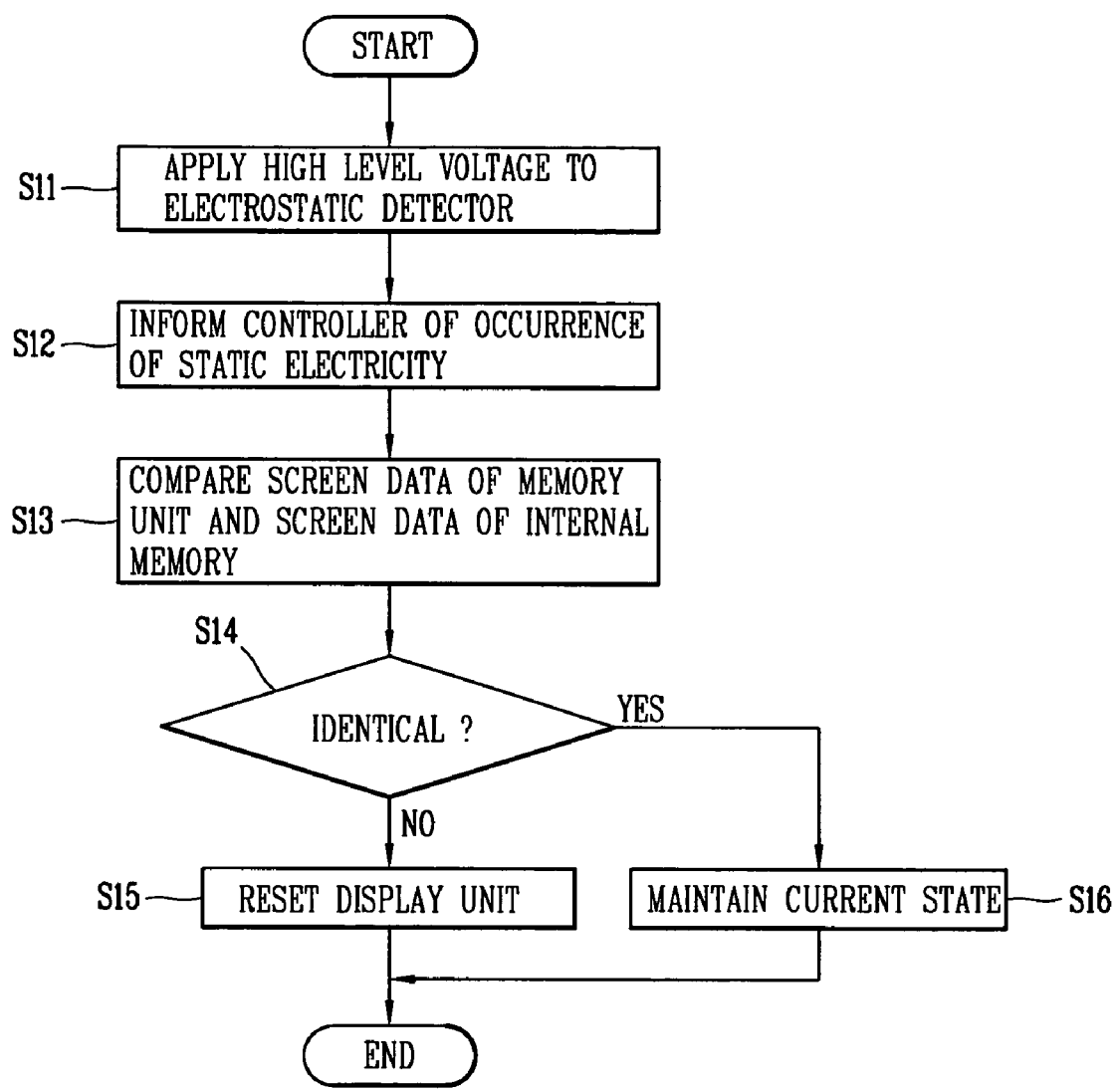

CONTROLLING APPARATUS AND METHOD OF MOBILE COMMUNICATION TERMINAL USING ELECTROSTATIC DETECTION

BACKGROUND OF THE INVENTION

1. Field of the Invention

The present invention relates to a mobile communication terminal and, more particularly, to a controlling apparatus and method of a mobile communication terminal using electrostatic detection capable of sensing a malfunction through static electricity generated from the mobile communication terminal.

2. Description of the Related Art

Recently, in mobile communication terminals, a plurality of circuits are integrated to implement diverse supplementary functions in addition to a voice communication. With its size restricted, the mobile communication terminal is required to use small-sized circuits operating at a low current. Since those circuits have a weak electric immunity, they can malfunctioned even due to a weak electric impact.

In general, users of the mobile communication terminals carry the mobile terminal in pockets or bags and are surrounded by lots of various electronic devices, so the mobile terminal is exposed in an electric impact-ridden environment. One of the big and frequent electric impacts to the mobile terminal is caused by static electricity which generates thousands of volts of high level voltage instantaneously.

Influence of static electricity on the mobile terminal causes noise during a call communication, malfunction of internal circuits, no-sensing(screen-freezing) phenomenon from a display unit, and even a power-off phenomenon.

In order to prevent such an influence of static electricity on the internal circuit of the mobile terminal, the case of the mobile terminal is formed of a non-conductive material, but still a considerable amount of static electricity affects the internal circuits of the mobile terminal.

The most-influenced part of the mobile terminal by static electricity is the display unit. That is, the display unit is prone to be exposed to static electricity because it has a physically larger area than other parts and is sensitive to voltage, and there are many signal lines therein.

FIG. 1 is a block diagram showing a structure of a controlling apparatus of a display unit of a mobile communication terminal in accordance with a related art.

As shown in FIG. 1, the controlling apparatus of a display unit of a mobile terminal comprises a display unit 20, a memory unit 30 storing screen data to be displayed on the display unit 20, and a controller 10 for providing screen data stored in the memory unit 30 to the display unit 20 and controlling the operation of the display unit 20.

The display unit 20 itself includes a driver (not shown), a graphic controller (not shown) and a memory (not shown), and the controller 10 controls the operation of the display unit 20 according to opening and closing of a folder or a flip.

When the graphic controller (not shown) of the display unit 20 receives an electric impact by static electricity, a no-sensing (that is, function-down) phenomenon occurs that the display unit 20 is stopped or its image is broken. The no-sensing phenomenon refers to every type of malfunction that may occur at the display unit 20, not a normal image output, including, for example, an electric impact to a construction element of the display unit 20 by static electricity, a malfunction of interface parts connected to a main controller of the mobile terminal, and any malfunction generated at other parts of the display unit 20.

In order to resolve such a no-sensing phenomenon generated at the display unit 20, the display unit 20 can be forcefully reset through the operation of closing and opening of the folder or the flip of the mobile terminal. Namely, the operation of the display unit 20 is stopped when the folder or the flip is closed, and a display content of a screen of the display unit is renewed by the operation of opening the folder or the flip.

The controller 10 of the related mobile terminal is not able to recognize occurrence of static electricity, so it fails to recognize the no-sensing state of the display unit 20 due to static electricity.

Thus, since the controlling apparatus of the display unit of the mobile communication terminal cannot recognize a malfunction generated at the display unit by the influence of static electricity, a user must personally recognize a malfunction and reset the mobile terminal manually.

In addition, with the controlling apparatus of the display unit of the related mobile communication terminal, the user could mistakenly recognize such a no-sensing phenomenon generated at the display unit as a breakdown of the mobile terminal, causing a problem that a reliability of the mobile terminal is degraded.

SUMMARY OF THE INVENTION

Therefore, an object of the present invention is to provide a controlling apparatus and method of a mobile communication terminal using electrostatic detection capable of sensing a malfunction of a display unit through static electricity generated at a mobile terminal and automatically resetting a display unit.

To achieve at least these advantages in whole or in part, there is provided a controlling apparatus of a mobile communication terminal using electrostatic detection, including: an electrostatic detector for sensing a voltage at higher than predetermined level and outputting it as a logic signal; a display unit for outputting screen data stored in an internal memory; a memory unit for storing in real time the screen data transmitted to the display unit; and a controller for recognizing occurrence of static electricity through an output of the electrostatic detector and resetting the display unit if the screen data stored in the memory unit and the screen data displayed on the display unit are different.

To achieve at least these advantages in whole or in part, there is further provided a controlling method of a mobile communication terminal using electrostatic detection, including: recognizing occurrence of static electricity; comparing screen data stored in a memory unit and screen data stored in an internal memory of a display unit; and resetting the display unit if the two screen data are different.

To achieve at least these advantages in whole or in part, there is further provided a controlling method of a mobile communication terminal using electrostatic detection, including: a step in which a voltage greater than a predetermined value is applied to an electrostatic detector; a step in which the electrostatic detector transmits a logic signal to a controller; a step in which screen data stored in a memory unit and screen data stored in an internal memory of a display unit are compared; and a step in which if the compared screen data are different, the display unit and the electrostatic detector are reset.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements and wherein:

FIG. 4 is a flow chart of a controlling method of a mobile communication terminal using electrostatic detection in accordance with the preferred embodiment of the present invention.

DETAILED DESCRIPTION OF THE PREFERRED EMBODIMENTS

Figure 1:
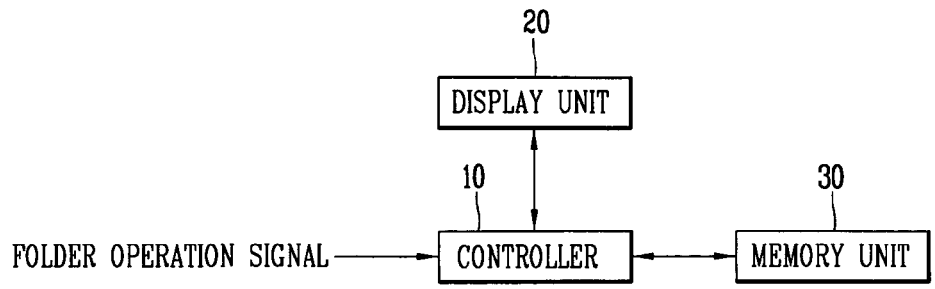
FIG. 1 is a block diagram showing the construction of a display unit controlling apparatus of a mobile communication terminal in accordance with a related art.
Figure 2:
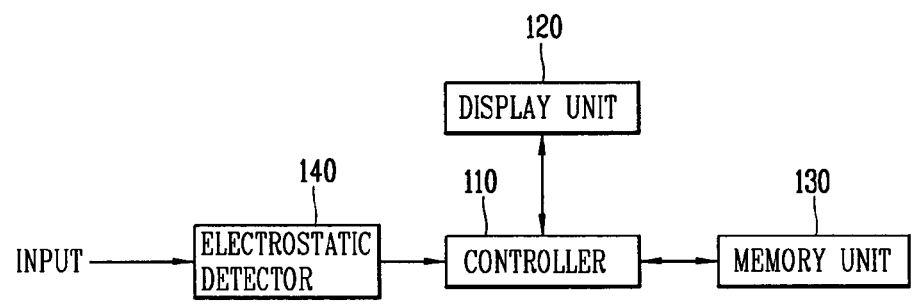
FIG. 2 is a block diagram showing the construction of a controlling apparatus of a mobile communication terminal using electrostatic detection in accordance with a preferred embodiment of the present invention.

FIG. 2 is a block diagram showing the construction of a controlling apparatus of a mobile communication terminal using electrostatic detection in accordance with a preferred embodiment of the present invention.

As shown in FIG. 2, the controlling apparatus of the mobile communication terminal using electrostatic detection comprises: an electrostatic detector 140 sensing a voltage inputted beyond a predetermined value and outputting a logic signal; a display unit 120 outputting screen data stored in an internal memory (not shown); a memory unit 130 storing in real time the screen data transmitted to the display unit 120; and a controller 110 recognizing occurrence of static electricity through the output of the electrostatic detector 140, comparing the screen data stored in the memory unit 130 and the screen data being displayed on the display unit 120, and resetting the display unit 120 if the two screen data are different.

If a high level voltage greater than a predetermined value is instantaneously applied to the electrostatic detector 140, the electrostatic detector 140 detects it and transmits a fixed logic signal to general input/output ports (GPIO1 and GPIO2) of the controller 110. Then, the controller recognizes it and transmits a reset signal both to the display unit and the electrostatic detector 140, thereby initializing the output.

The display unit 120 includes a panel (not shown), a driver (not shown), a graphic controller (not shown) and an internal memory (not shown). When the screen data inputted from the controller 110 is stored in the internal memory (not shown) of the display unit 120, the stored content is displayed on the display unit 120 by the graphic controller (not shown).

The controller 110 provides the screen data simultaneously to the internal memory of the display unit 120 and to the memory unit 130, a part of a main memory unit, and outputs a current state of the mobile terminal on the display unit 120.

The memory unit 130 operates as a mirror storing unit for storing the same screen data as the screen data of the display unit 120 on a real time basis, and the controller 110 determines whether the display unit 120 is normally operated by comparing the screen data of the memory unit 130 and the screen data of the internal memory unit.

In other words, if the display unit 120 is malfunctioned by static electricity, the screen data stored in the internal memory (not shown) of the display unit 120 differs from the screen data stored in the memory 130, whereby the operation state of the display unit 120 can be determined.

If static electricity is detected, the display unit 120 is reset by software, and if a no-sensing phenomenon occurs, it is checked and the display unit 120 is reset, thereby minimizing a user's inconvenience.

Figure 3:
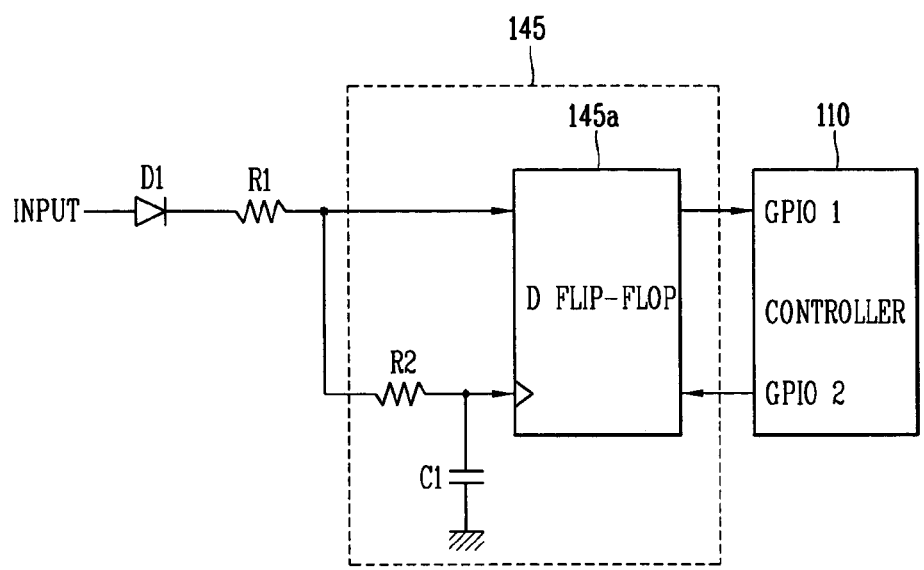
FIG. 3 is a circuit diagram showing an electrostatic detector in the apparatus of FIG. 2.

FIG. 3 is a circuit diagram showing an electrostatic detector in accordance with the present invention.

As shown in FIG. 3, the electrostatic detector comprises a diode D1 turned on at a voltage higher than a predetermined value, a voltage limiting resistor R1, and a logic circuit unit 145 consisting of a resistor R2, a capacitor C1 and a D flip-flop 145a and generating a clock signal.

The logic circuit unit 145 transmits a logic signal as to whether static electricity has occurred, to the controller 110. Upon receiving the logic signal with respect to occurrence of static electricity, the controller 110 generates/outputs a control signal to reset the logic circuit unit 145.

The diode D1 is a high capacity diode which is turned on and operates only when a voltage applied from an input port is higher than a predetermined value. For example, if the diode has a 50V capacity, it is turned on only when an electrostatic signal of 50V or higher is applied thereto. In the present invention, the diode serves as an electrostatic switch.

The voltage limiting resistor R1 is connected in series to the diode D1 and limits the electrostatic voltage to an internally acceptable level. That is, if an electrostatic voltage so high as to turn on the diode D1 is applied, it can not be provided directly to the internal circuit, so the voltage limiting resistor R1 limits the voltage to an internally acceptable level. In this case, in order to drop the high level voltage of 50V or greater to a 5V or lower, a resistor having a resistance of a few MΩ is preferably used.

The D flip-flop 145a maintains the signal state according to the occurrence of static electricity until the controller 110 recognizes the electrostatic signal. The electrostatic signal, which has passed the voltage limiting resistor R1, is limited to a voltage at the internally acceptable level, but its current is too weak and its duration is too short to be applied directly to the controller 110. In other words, since the controller 110 performs various calculations and operations, it may not capture the electrostatic signal which occurs for a very short time.

Thus, the D flip-flop 145a maintains the signal state according to occurrence of static electricity until the controller 110 recognizes the electrostatic signal. When the controller 110 recognizes the output signal of the D flip-flop 145a, it resets the D flip-flop 145a to initialize it to a signal output state before obtaining the electrostatic voltage (that is, logic 0).

The D flip-flop 145a receives an input signal applied as a clock signal and determines an output logic state according to the input voltage, so that the D flip-flop 145a should generate a clock signal on receiving the electrostatic signal applied to the input port. An RC delay circuit consisting of the resistor R2 and the capacitor C1 is connected to a clock port for generating the clock signal.

As for the D flip-flop 145a, the input signal should be applied to the input port before the clock signal is inputted, so the RC delay circuit accumulates a voltage which has passed the delay resistor R2 in the delay capacitor C1 in order to slow a setup time.

One part of the electrostatic signal which has been branched after passing through the voltage limiting resistor R1 is provided directly to the input port of the D flip-flop 145a and the other part is provided with a setup time delay to the clock port of the D flip-flop 145a through the RC delay circuit, so that the D flip-flop 145a can latch the instantly generated electrostatic signal.

FIG. 4 is a flow chart of a controlling method of a mobile communication terminal using electrostatic detection in accordance with the preferred embodiment of the present invention.

The operation of FIGS. 2 and 3 will now be described in detail with reference to FIG. 4.

First, when static electricity is generated inside or outside the mobile terminal and a high level voltage greater than a predetermined value is applied to the electrostatic detector 140 (step S11), the electrostatic detector 140 informs the controller 110 of the occurrence of static electricity through a logic signal (step S12).

Upon recognizing the occurrence of static electricity, the controller 110 compares the screen data stored in the memory unit 130 and the screen data of the internal memory (not shown) installed in the display unit 120 (step S13) and judges whether they are identical (step S14).

If the screen data of the memory unit 130 and the screen data of the internal memory are not identical, the controller 110 determines that a no-sensing (that is, a breakdown) phenomenon has occurred at the display unit 120 due to static electricity, and resets the display unit 120 (step S15). However, if both screen data are identical, the controller determines that the display unit 120 is not malfunctioned in spite of the occurrence of static electricity, and keeps performing the current operation of the display unit 120 (step S16).

The process by which the electrostatic detector 140 informs the controller 110 of the occurrence of static electricity will now be described in detail.

A high level voltage electrostatic signal generated due to the static electricity conducts through the diode D1 of the electrostatic detector 140, and the voltage of the electrostatic signal outputted through the diode D1 is dropped through the voltage limiting resistor R1 to a voltage of internally acceptable level.

After passing through the voltage limiting resistor R1, the electrostatic signal is divided to be applied both to the input port and to the RC delay circuit of the D flip-flop 145a. Since the electrostatic signal applied to the RC delay circuit has a lengthened setup time as it must pass through the delay resistor R2 and charge the delay capacitor C1, the delayed electrostatic signal is provided as a clock signal so that the D flip-flop 145a can latch the data directly inputted to its input port.

The D flip-flop 145a generates a logic signal by using the electrostatic signal applied to the input port and the signal applied to the clock port after passing through the RC delay circuit. At this time, the D flip-flop 145a uses the truth table characteristics that a logical value applied to the input port is outputted as it is.

That is, if no electrostatic signal is inputted to the input port, the D flip-flop 145a maintains outputting of '0', whereas if an electrostatic signal is applied to the input port, the D flip-flop 145a determines that '1' has been inputted and outputs '1' to the controller 110 to inform of the occurrence of static electricity.

Upon receiving '1' from the D flip-flop 145a, the controller 110 recognizes the occurrence of static electricity and provides a control signal for resetting the display unit 120 and a control signal for initializing a signal output of the D flip-flop 145a to '0' to the display unit 120 and the D flip-flop 145a, respectively.

As so far described, the controlling apparatus and method of a mobile communication terminal using electrostatic detection has the following advantages.

That is, the controller can recognize whether static electricity having a bad influence on the internal circuitry of the mobile terminal has occurred, and a malfunction due to the occurrence of static electricity can be prevented.

In addition, when a no-sensing phenomenon is generated at a display unit due to occurrence of static electricity, the display unit is automatically reset, so that user's convenience can be increased and an operational reliability of the mobile terminal can be enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A controlling apparatus of a mobile communication terminal using electrostatic detection, comprising:
   an electrostatic detector for sensing a voltage at a higher than predetermined level and outputting it as a logic signal;
   a display unit for displaying screen data stored in an internal memory;
   a memory unit for storing in real time the screen data displayed by the display unit; and
   a controller for recognizing occurrence of static electricity through an output of the electrostatic detector and resetting the display unit if the screen data stored in the memory unit and the screen data displayed on the display unit are different, the controller continuously maintaining an operation state of the display unit if the screen data stored in the memory unit and the screen data displayed on the display unit are identical.

2. The apparatus of claim 1, wherein the electrostatic detector comprises:
   a diode which forwardly conducts at a voltage greater than a predetermined value;
   a resistor for reducing a voltage of an electrostatic signal which has passed through the diode to an internally acceptable voltage; and
   a logic circuit unit for outputting a logic signal by using the voltage-dropped electrostatic signal.

3. The apparatus of claim 2, wherein the logic circuit unit comprises:
   an RC delay circuit for delaying a setup time of the electrostatic signal which has passed the resistor; and
   a flip-flop for receiving the resistor-passed electrostatic signal and a signal of the RC delay circuit and outputting a logic signal.

4. The apparatus of claim 3, wherein the flip-flop is a D type flip-flop.

5. The apparatus of claim 3, wherein the flip-flop provides the logic signal to a general port of the controller and then receives a reset signal from the controller.

6. The apparatus of claim 1, wherein the controller resets the display unit and the electrostatic detector.

7. A controlling method of a mobile communication terminal using electrostatic detection, comprising:
- recognizing occurrence of static electricity;
- comparing screen data stored in a memory unit and screen data stored in an internal memory of a display unit;
- resetting the display unit if the compared screen data are different; and
- continuously maintaining an operation state of the display unit if the compared screen data are identical.

8. The method of claim 7, wherein the resetting the display unit further comprises:
- resetting an electrostatic detector.

9. The method of claim 7, wherein the recognizing occurrence of static electricity comprises:
- outputting a logic signal by an electrostatic detector if a voltage greater than a prescribed value is generated; and
- recognizing by a controller the occurrence of static electricity upon receipt of the logic signal.

10. A controlling method of a mobile communication terminal using electrostatic detection, comprising:
- applying a voltage greater than a predetermined value to an electrostatic detector;
- transmitting by the electrostatic detector a logic signal to a controller;
- comparing screen data stored in a memory unit and screen data stored in an internal memory of a display unit;
- resetting the display unit and the electrostatic detector if the compared screen data are different; and
- continuously maintaining an operation state of the display unit if the compared screen data are identical.

* * * * *